United States Patent [19]

Popov et al.

[11] 4,208,596
[45] Jun. 17, 1980

[54] LINEAR INDUCTION MOTOR

[76] Inventors: Alexandr D. Popov, pereulok Rynochny, 44; Vladimir A. Solomin, ulitsa Dachnaya, 14, kv. 31, both of Rostov-na-Donu, U.S.S.R.

[21] Appl. No.: 952,598

[22] Filed: Oct. 18, 1978

[51] Int. Cl.² .................................................. H02K 41/02
[52] U.S. Cl. ........................................ 310/13; 310/166
[58] Field of Search ................ 310/184, 185, 12–14, 310/198, 166

[56] References Cited

U.S. PATENT DOCUMENTS

| 3,770,995 | 11/1973 | Eastham et al. | 310/13 |
| 4,075,521 | 2/1978 | Nordebo | 310/184 |

FOREIGN PATENT DOCUMENTS

| 1314 161 | 4/1973 | United Kingdom . |
| 1316131 | 5/1973 | United Kingdom . |
| 544065 | 1/1977 | U.S.S.R. . |

OTHER PUBLICATIONS

*Magnetic Hydrodynamics,* Zinatne Pub., Riga, 1969, #2, pp. 107–110.

*Primary Examiner*—Donovan F. Duggan
*Attorney, Agent, or Firm*—Fleit & Jacobson

[57] ABSTRACT

A linear induction motor comprising an inductor formed of individual transversal laminations surrounded by a main polyphase concentrated winding and provided with rods interconnected by means of a yoke. It also comprises a secondary element with respect to which the inductor moves. The secondary element has an electrically conductive part arranged on a magnetically conductive base. Each lamination is provided with two additional polyphase windings the magnetizing force of which sets up magnetic fields travelling in opposite directions transversely of inductor movement. The end faces of the lateral rods of the core structure are provided with slots arranged on the side of the secondary element and adapted to receive the additional polyphase windings.

1 Claim, 2 Drawing Figures

LINEAR INDUCTION MOTOR

FIELD OF THE INVENTION

This invention relates to electrical machines and in particular to linear induction motors.

The linear induction motor forming the subject of the present invention is suitable for use with high-speed ground transport systems. It lay also find wide applications in conveyer installations and in various power drives wherein working members perform a rectilinear or reciprocating motion, for example, within systems transporting rolled non-ferrous sheets along an overhead magnetic way, which precludes physical damage to machined surfaces.

DESCRIPTION OF THE PRIOR ART

Prior art linear induction motors produce adequate tractive and levitational forces. A limiting factor, however, is that inductor position with respect to a secondary element is likely to be upset under the action of incidental lateral disturbances.

Known in the art is a linear induction motor (cf. British Patent Ser. No. 1,316,131 Cl. H2A, 1973) comprising an inductor formed of individual inverted U-shape transversal laminations surrounded by a polyphase concentrated winding and interconnected by inverted U-shape longitudinal laminations and a secondary element having an electrically conductive part arranged on a magnetically conductive base.

The aforesaid motor develops no forces to stabilize inductor position with respect to the secondary element.

Also known in the art is a linear induction motor (cf. British Patent Ser. No. 1,314,161 Cl. H2A, 1973) comprising an inductor formed of individual transversal laminations surrounded by a main polyphase concentrated winding and having rods interconnected by means of a yoke and a secondary element with respect to which the inductor moves, the secondary element having an electrically conductive part arranged on a magnetically conductive base.

In the aforesaid motor the core structure of the inductor does not permit transversal stabilization of the inductor with respect to the direction of movement, if any lateral disturbances exist. In such a case the travel path of the inductor changes and its interaction with the secondary element is upset.

SUMMARY OF THE INVENTION

It is an object of the present invention to attain transversal stabilization of an inductor with respect to the direction of movement.

This object is accomplished by that in a linear induction motor comprising an inductor formed of individual transversal laminations surrounded by a main polyphase concentrated winding and provided with rods interconnected by means of a yoke and a secondary element with respect to which the inductor moves, wherein the secondary element has an electrically conductive part arranged on a magnetically conductive base, according to the invention, each lamination is provided with two additional polyphase windings the magnetizing force of which sets up magnetic fields travelling in opposite directions transversely of inductor movement, end faces of lateral rods of the core structure having slots arranged on the side of the secondary element and adapted to receive the additional polyphase windings.

The linear induction motor forming the subject of the present invention ensures transversal stabilization of the inductor with respect to the direction of movement. This advantage substantially increases safety of devices provided with a linear induction motor, for example, of high-speed ground transport systems.

DESCRIPTION OF THE DRAWINGS

The invention will now be described in greater detail with reference to a specific embodiment thereof, taken in conjunction with the accompanying drawings, wherein.

DESCRIPTION OF THE INVENTION

Figure 1:
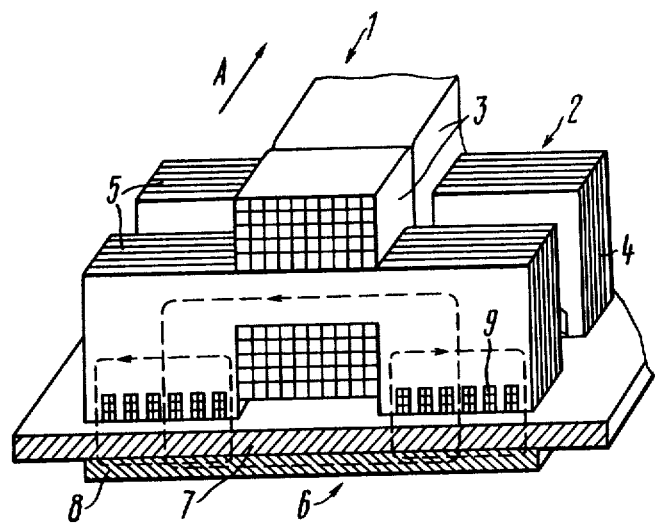
FIG. 1 is a perspective view of a linear induction motor with laminations each of which has two rods according to the invention.

The linear induction motor forming the subject of the present invention comprises an inductor 1 (FIG. 1) formed of individual transversal laminations 2 surrounded by a main polyphase concentrated winding 3. Each lamination 2 is provided with two lateral rods 4 interconnected by means of a yoke 5. The proposed linear induction motor also comprises a secondary element 6 with respect to which the inductor 1 moves. The secondary element has an electrically conductive part 7 arranged on a magnetically conductive base 8. Each lamination 2 is provided with two additional polyphase windings 9 the magnetizing force of which sets up magnetic fields travelling in opposite directions transversely of inductor 1 movement. End faces of the lateral rods 4 of the core structure 2 are provided with six slots arranged on the side of the secondary element 6 and adapted to receive the additional polyphase windings 9.

Figure 2:
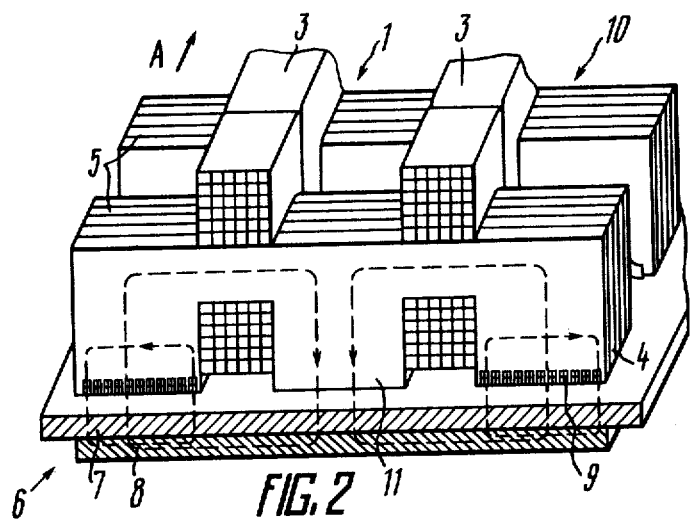
FIG. 2 is a perspective view of the linear induction motor shown in FIG. 1 with laminations each of which has three rods according to the invention.

In a preferred embodiment of the invention shown in FIG. 2 each lamination 10 is provided with two lateral rods 4 and one middle rod 11. End faces of the lateral rods 4 of each lamination 10 are provided with twelve slots adapted to receive two additional polyphase windings 9. The provision of a greater number of middle rods 11 for each lamination 10 makes it possible to increase power of the motor without changing its length.

The number of slots suited to receive the additional polyphase windings 9 depends on the type of winding, number of phases and number of pole pieces. So, a minimum number of slots for three-phase one-layer concentrated windings should be six at least twelve slots should be provided for two-layer windings. In the case of distributed polyphase additional windings the number of slots should be increased a whole number of times as compared with concentrated windings, depending on the distribution factor. A great number of slots will have to be used to match the increasing the number of phase and pole pieces in the additional polyphase winding 9.

The linear induction motor forming the subject of the present invention operates as follows.

Connecting the main polyphase winding 3 (FIG. 1) of the inductor 1 to a three-phase power source (not shown in the drawing) sets up a travelling magnetic field. This travelling magnetic field crosses the electrically conductive part 7 of the secondary element 6 with the result that electromotive forces are induced therein.

Three-phase eddy currents induced within the electrically conductive part 7 of the secondary element 6 under the action of the aforesaid electromotive forces interact with the travelling magnetic field of the inductor 1 whereby the linear induction motor will develop tractive and levitational forces. The tractive force causes the inductor 1 to move in the opposite sense to the travelling magnetic field (sense of inductor movement is shown with the arrow A in the drawing). Connecting the additional windings 9 to the three-phase power source sets up magnetic fields travelling in opposite directions transversely of inductor 1 movement and crossing the electrically conductive part 7 of the secondary element 6 with the result that electromotive forces are induced therein. Three-phase eddy currents are induced within the electrically conductive part 7 under the action of the aforesaid electromotive forces. The currents induced within the electrically conductive part 7 interact with the travelling magnetic fields set up by the additional windings, whereby opposite tractive forces equal in magnitude will be produced within each lamination 2.

If the inductor 1 is desplaced under the action of incidental lateral disturbances such, for instance, as a strong cross wind affecting the occupants of a high-speed ground transport system, the balance of the above forces will be upset and the inductor 1 will return to the original position under the action of a resultant force. Stated differently, the inductor position will be stabilized with respect to the secondary element 6.

A preferred embodiment of the invention shown in FIG. 2 operates in a similar manner. The provision of a middle rod 11 increases the forces of interaction between the inductor 1 and the secondary element 6 since a travelling magnetic field is set up both by the extreme rods 4 of the laminations 10 and by middle rod 11 thereof.

An advantage of the linear induction motor according to the invention is that it stabilizes inductor position with respect to a secondary element, which substantially increases safety of occupants of a high-speed ground transport system provided with a linear induction motor.

What is claimed is:

1. A linear induction motor comprising:
   an inductor;
   a secondary element with respect to which said inductor moves;
   a magnetically conductive base of said secondary element;
   an electrically conductive part of said secondary element arranged on said magnetically conductive base;
   transversal laminations of said inductor having rods and a yoke coupling said rods, the first lateral rods and the second lateral rods having suitable end faces;
   a first polyphase concentrated winding surrounding each said transversal lamination;
   first slots provided in said end faces of the first lateral rods of the laminations on the side of the secondary element;
   second slots provided in the end faces of the second lateral rods of the laminations on the side of said secondary element;
   a second polyphase winding eclosed within the first slots and producing a magnetizing force which sets up a magnetic field travelling transversely of said inductor movement;
   a third polyphase winding enclosed within the second slots and producing a magnetizing force which sets up a magnetic field travelling in the opposite sense to the magnetic field set up by the second polyphase winding.

* * * * *